United States Patent
Jiang et al.

(10) Patent No.: US 9,062,242 B2
(45) Date of Patent: Jun. 23, 2015

(54) CROSS-LINKERS FOR HYDRAULIC FRACTURING FLUID

(75) Inventors: Li Jiang, Katy, TX (US); Michael D. Parris, Richmond, TX (US); Richard D. Hutchins, Sugar Land, TX (US); Javier Sanchez Reyes, Katy, TX (US); Christina D. Martin, Channelview, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 639 days.

(21) Appl. No.: 13/414,864

(22) Filed: Mar. 8, 2012

(65) Prior Publication Data

US 2012/0245060 A1 Sep. 27, 2012

Related U.S. Application Data

(60) Provisional application No. 61/450,684, filed on Mar. 9, 2011.

(51) Int. Cl.

| C09K 8/58 | (2006.01) |
|---|---|
| C09K 8/512 | (2006.01) |
| C09K 8/504 | (2006.01) |
| C09K 8/516 | (2006.01) |
| C09K 8/66 | (2006.01) |
| C09K 8/68 | (2006.01) |
| C09K 8/70 | (2006.01) |
| C09K 8/88 | (2006.01) |
| C09K 8/90 | (2006.01) |

(52) U.S. Cl.
CPC .............. *C09K 8/512* (2013.01); *C09K 8/5045* (2013.01); *C09K 8/516* (2013.01); *C09K 8/665* (2013.01); *C09K 8/685* (2013.01); *C09K 8/70* (2013.01); *C09K 8/887* (2013.01); *C09K 8/90* (2013.01); *C09K 2208/10* (2013.01); *C09K 2208/08* (2013.01); *C09K 2208/26* (2013.01)

(58) Field of Classification Search
None
See application file for complete search history.

(56) References Cited

U.S. PATENT DOCUMENTS

| 3,692,676 | A | 9/1972 | McClaflin et al. | |
|---|---|---|---|---|
| 4,741,401 | A | 5/1988 | Walles et al. | |
| 5,981,446 | A | 11/1999 | Qiu et al. | |
| 6,011,075 | A * | 1/2000 | Parris et al. | 521/64 |
| 6,310,104 | B1 | 10/2001 | Keiser et al. | |
| 6,372,805 | B1 | 4/2002 | Keiser et al. | |
| 6,482,866 | B1 | 11/2002 | Dahayanake et al. | |
| 6,605,570 | B2 * | 8/2003 | Miller et al. | 507/211 |
| 6,703,352 | B2 | 3/2004 | Dahayanake et al. | |
| 7,081,439 | B2 * | 7/2006 | Sullivan et al. | 507/269 |

(Continued)

FOREIGN PATENT DOCUMENTS

| EP | 1267034 A2 | 12/2002 |
|---|---|---|
| WO | 9916708 A1 | 4/1999 |

OTHER PUBLICATIONS

Drinking Water Health Advisory for Boron and United States Environmental Protection Agency, May 2008, 65 pages.
Software estimates chemical, physical properties, Chemical and Engineering News, vol. 63(5), Feb. 4, 1985, p. 27.

(Continued)

*Primary Examiner* — John J Figueroa
(74) *Attorney, Agent, or Firm* — Jeremy Tilman; Rachel Greene

(57) ABSTRACT

A method of forming a wellbore fluid, the method including introducing a hydratable polymer and introducing a crosslinker comprised of at least a silica material, the crosslinker having a dimension of from about 5 nm to about 100 nm.

9 Claims, 2 Drawing Sheets

(56) References Cited

U.S. PATENT DOCUMENTS

Figure 1:
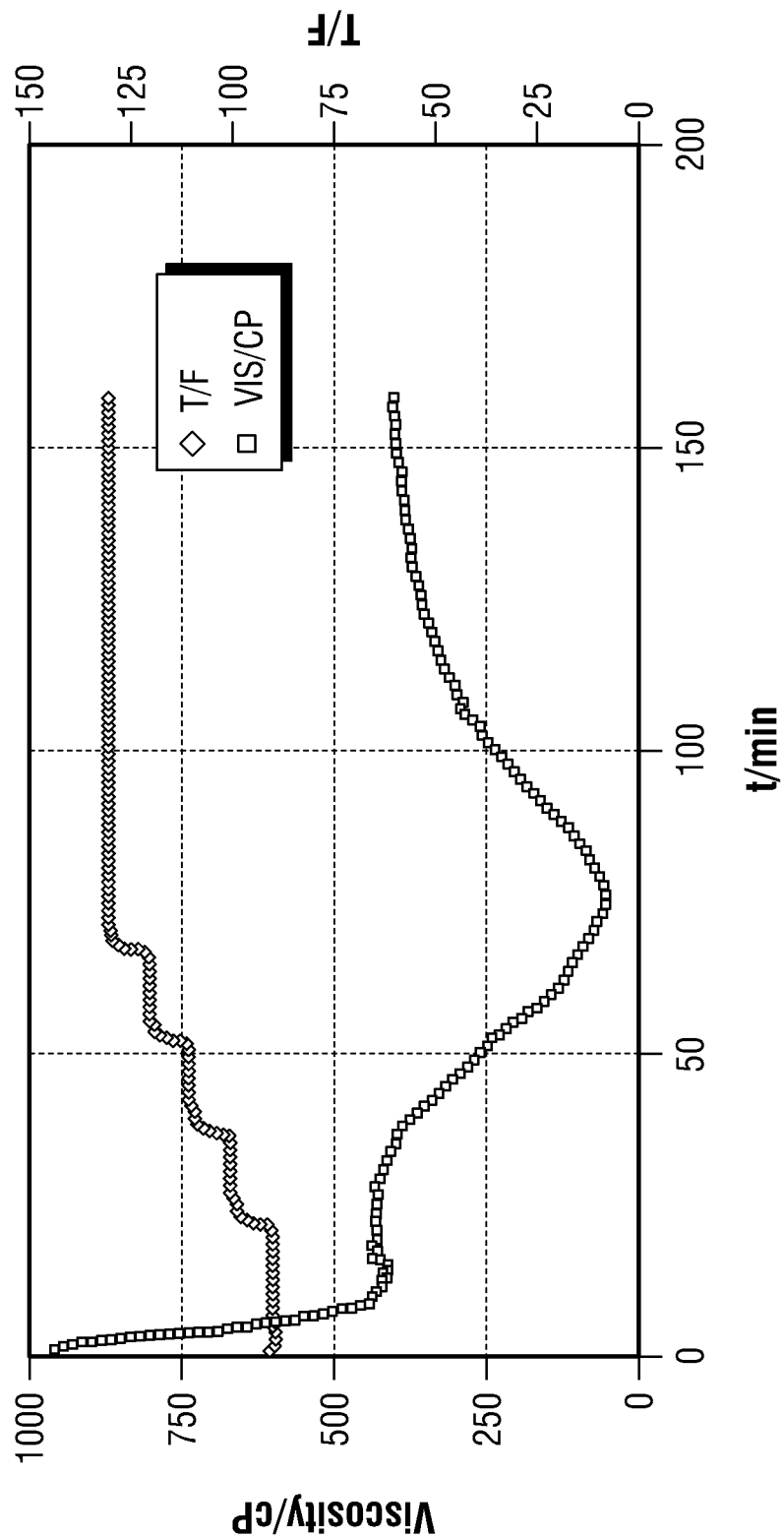

| | | |
|---|---|---|
| 7,482,310 B1 | 1/2009 | Reese et al. |
| 7,497,263 B2 | 3/2009 | Parris et al. |
| 7,888,295 B2 | 2/2011 | Fu et al. |
| 7,968,501 B2 | 6/2011 | Parris |
| 2002/0160920 A1 | 10/2002 | Dawson et al. |
| 2002/0169085 A1 | 11/2002 | Miller et al. |
| 2008/0248978 A1* | 10/2008 | Huang et al. ............ 507/271 |
| 2009/0149354 A1 | 6/2009 | Dajani et al. |

OTHER PUBLICATIONS

Fail, et al., General, reproductive, developmental, and endocrine toxicity of boronated compounds, Reprod Toxicol., vol. 12(1), 1998, pp. 1-18.

World Health Organization, Boron in drinking-water, WHO Guidelines for Drinking-water Quality, 2009, 28 pages.

Young, Nuts, Kirk-Othmer Encyclopedia of Chemical Technology, Dec. 4, 2000, pp. 1-29.

International Search Report and Written Opinion issued in PCT/US2012/028558 on Sep. 26, 2012, 13 pages.

* cited by examiner

CROSS-LINKERS FOR HYDRAULIC FRACTURING FLUID

CROSS-REFERENCE TO RELATED APPLICATIONS

The present application claims priority to U.S. Provisional Patent Application No. 61/450,684, filed Mar. 9, 2011, the disclosure of which is incorporated by reference herein in its entirety.

TECHNICAL FIELD

This present disclosure relates generally to the field of crosslinkers for oilfield application, and relates more particularly, but not by way of limitation, to methods of using crosslinkers in various oilfield applications.

BACKGROUND

To enhance or increase the production of oil and gas hydrocarbons from wells bored into subterranean-formations, it has been common practice to pump a viscous fluid at high pressures down into the wellbore to crack the formation and force the fracturing fluid into those cracks. The fracturing fluid is also used to carry sand or other types of particles, called proppants, to hold the cracks open when the pressure is relieved. The cracks held open by the proppant provide additional paths for the oil or natural gas to reach the wellbore, which, in turn, increases the production of oil and/or natural gas from the well.

In order to form the viscous fluid, a thickening agent (or a viscosifying agent), such as a polymer, is incorporated into water or an aqueous solution. A number of polymers are known for this purpose including a number of polysaccharides. Viscosity can then be increased considerably, giving a viscoelastic gel, by cross-linking the polymer molecules. This has particular application in connection with the extraction of hydrocarbons such as oil and natural gas from a reservoir which is a subterranean geologic formation by means of a drilled well that penetrates the hydrocarbon-bearing reservoir formation. In this field, one commercially very significant application of thickened fluids is for hydraulic fracturing of a subterranean formation. The polymeric thickening agent may (1) assist in controlling leak-off of the fluid into the formation, (2) aid in the transfer of hydraulic fracturing pressure to the rock surfaces and (3) facilitate the suspension and transfer into the formation of proppant materials that remain in the fracture and thereby hold the fracture open when the hydraulic pressure is released.

Further applications of thickened fluids in connection with hydrocarbon extraction may include acidizing, control of fluid loss, diversion, zonal isolation, and the placing of gravel packs. Gravel packing is a process of placing a volume of particulate material, frequently coarse sand, within the wellbore and possibly extending slightly into the surrounding formation. The particulate material used to form a gravel pack may be transported into place in suspension in a thickened fluid. When it is in place, the gravel pack acts as a filter for fine particles so that they are not entrained in the produced fluid.

Crosslinking of the polymeric materials then serves to increase the viscosity and proppant carrying ability of the fluid, as well as to increase its high temperature stability. Typical crosslinking agents comprise soluble boron, zirconium, and titanium compounds. Chromium and aluminum compounds have also been used. The viscosity of solutions of guar gum and similar thickeners can be greatly enhanced by crosslinking them with boric acid or other boron containing materials. Thus, boron crosslinked guar gum solutions are useful as fracturing fluids.

Historically, as described in U.S. Pat. Nos. 6,310,104 and 6,372,805, the disclosures of which are incorporated by reference herein in their entirety, amorphous borosilicate particles in the size domain of 10-20 nm and in the concentration range of 20-40 wt % in water solvent have been used in the paper industry. The mono-dispersion is achieved by adding aqueous silicic acid to an aqueous boric oxide solution with extended agitation, followed by recovering the aqueous colloids containing amorphous, not glassy, borosilicate nanospheres. These products have been used in paper industry to increase the conversion of trees to paper by insuring that raw material fibers used in the process are retained and become part of the final paper sheet. They also facilitate the capture of raw material fibers in the produced paper sheet and minimize the loss of value resources to the generation of waste. In addition, they enhance the removal of water from municipal sludges which reduces fuel consumption during transportation of the sludges. However, neither of the above references described that amorphous borosilicate may be used a crosslinker for a wellbore composition used to treat a subterranean formation.

The viscosity of these crosslinked gels can be reduced by mechanical shearing (i.e., they are shear thinning) but gels cross-linked with boron compounds may reform spontaneously after exposure to high shear. This property of being reversible makes boron-crosslinked gels particularly attractive and they have been widely used. Furthermore, the overall performance of a fracturing fluid intimately depends on the cross-linking chemistry that forms the viscous gel. Borate crosslinked gel fracturing fluid typically utilize the borate anion to crosslink the hydrated polysaccharide polymers and thus provide increased viscosity. The crosslinked polymer may then be rendered chemically reversible by altering the pH of the fluid system. It is this reversible characteristic of crosslinked borate polymer fluids that may improve the effectiveness of the subsequent clean up step more effectively, and thus potentially result in good regained permeability and conductivity.

It is generally desirable to achieve the desired viscosity with a low concentration of thickening materials so as to reduce cost of materials and reduce the amount of material which is delivered below ground and may need to be removed in a subsequent cleanup operation. Also, boron and metals, in sufficient concentration, can be toxic to the environment and so it is also desirable to minimize the amount of boron or metallic cross-linking agent which is used.

Additionally, it is desirable to develop a new cross-linker material that is completely free of boron or, alternatively, to use an insoluble form of boron with an identical electronic configuration of borax so that the well established boron crosslink chemistry can remain intact.

SUMMARY OF THE DISCLOSURE

There is a need, addressed by the subject matter described herein, for a wellbore composition and a method of forming and/or applying a wellbore composition, to resolves the above issues.

The above and other issues are addressed by the present application, wherein in embodiments, the application relates to a method of forming a wellbore fluid, the method comprising: introducing a hydratable polymer; and introducing a crosslinker comprised of at least a silica material, the crosslinker having a dimension of from about 5 nm to about 100 nm.

In embodiments, described herein is a method of treatment of a wellbore or a subterranean formation penetrated by a wellbore, the method comprising: introducing a wellbore composition to the wellbore or the subterranean formation, the wellbore composition comprised of at least a hydratable polymer and a crosslinker, wherein the crosslinker is comprised of at least a silica material, the crosslinker having a dimension of from about 5 nm to about 100 nm.

BRIEF DESCRIPTIONS OF DRAWINGS

FIG. 1 represents the rheological profile for Example 1 comprised of a 5 ppm borosilicate colloidal dispersion crosslinked with 30 lbm/1,000 gal US guar at 130° F. at a constant pressure of 200 psia and at a shear rate 100/s (pH 9.1).

Figure 2:
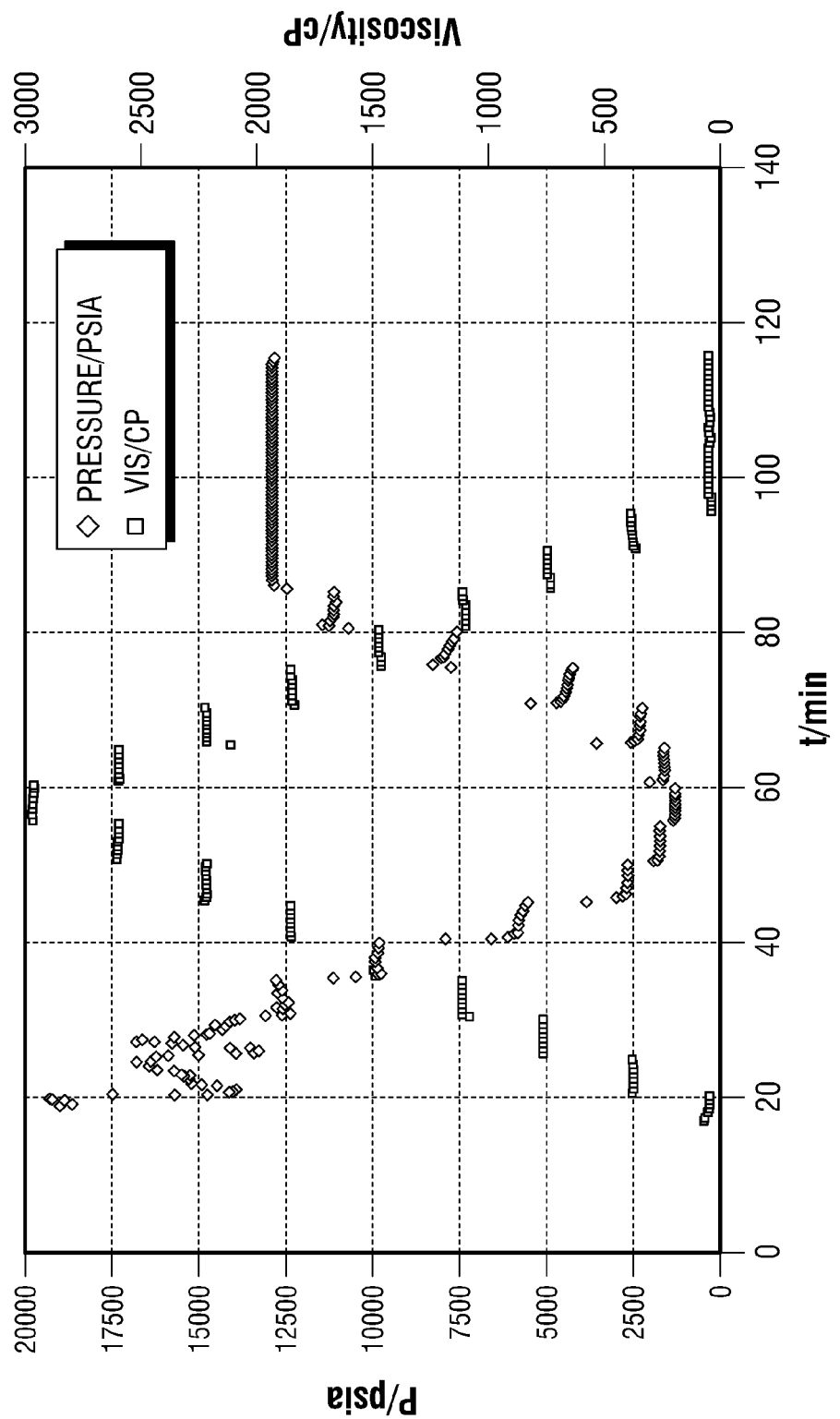

FIG. 2 represents the rheological profile for Example 2 comprised of a 12.4 ppm borosilicate colloidal dispersion crosslinked with 30 lbm/1,000 gal US guar at 120° F. at multiple pressure rampings between ambient and 20,000 psia and at a shear rate 100/s (pH 9.4).

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the application and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at."

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "fracturing" refers to the process and methods of breaking down a geological formation and creating a fracture, i.e., the rock formation around a wellbore, by pumping fluid at very high pressures (pressure above the determined closure pressure of the formation), in order to increase production rates from or injection rates into a hydrocarbon reservoir. The fracturing methods otherwise use conventional techniques known in the art.

A "crosslinker" or "crosslinking agent" is a compound mixed with a base-gel fluid to create a viscous gel. Under proper conditions, the crosslinker reacts with a multiple-strand polymer to couple the molecules, creating a crosslinked polymer fluid of high, but closely controlled, viscosity.

The term "hydraulic fracturing" as used in the present application refers to a technique that involves pumping fluids into a well at pressures and flow rates high enough to split the rock and create opposing cracks extending up to 300 m (1000 feet) or more from either side of the borehole. Later, sand or ceramic particulates, called "proppant," are carried by the fluid to pack the fracture, keeping it open once pumping stops and pressures decline.

As used herein, the new numbering scheme for the Periodic Table Groups are used as in Chemical and Engineering News, 63(5), 27 (1985).

As used herein, the term "liquid composition" or "liquid medium" refers to a material which is liquid under the conditions of use. For example, a liquid medium may refer to water, and/or an organic solvent which is above the freezing point and below the boiling point of the material at a particular pressure. A liquid medium may also refer to a supercritical fluid.

As used herein, the term "polymer" or "oligomer" is used interchangeably unless otherwise specified, and both refer to homopolymers, copolymers, interpolymers, terpolymers, and the like. Likewise, a copolymer may refer to a polymer comprising at least two monomers, optionally with other monomers. When a polymer is referred to as comprising a monomer, the monomer is present in the polymer in the polymerized form of the monomer or in the derivative form of the monomer. However, for ease of reference the phrase comprising the (respective) monomer or the like is used as shorthand.

The terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Described herein is a method of well treatment, that includes a method of forming a wellbore fluid, the method comprising: introducing a hydratable polymer; and introducing a crosslinker comprised of at least a silica material, the crosslinker having a dimension of from about 5 nm to about 100 nm.

Polymer

In certain embodiments of the present application, the well treatment fluid comprises at least one polymer (also referred to as a "viscosifier") and at least one crosslinker, the polymer and crosslinker reacting under proper conditions to form a crosslinked polymer. The polymer should not prematurely crosslink before the desired set time. The polymer may be a hydratable polymer, such as a polysaccharide.

The hydratable polymer may be a high molecular weight water-soluble polysaccharide containing cis-hydroxyl groups that can complex the crosslinking agent. Without limitation, suitable polysaccharides include those polysaccharides having a molecular weight in the range of about 200,000 to about 3,000,000 Daltons, such as, for example, from about 500,000 to about 2,500,000 Daltons and from about 1,500,000 and 2,500,000 Daltons.

Polysaccharides having adjacent cis-hydroxyl groups for the purposes of the present application include such polysaccharides as the galactomannans. The term galactomannans refers in various aspects to natural occurring polysaccharides derived from various endosperms of seeds. They are primarily composed of D-mannose and D-galactose units. They generally have similar physical properties, such as being soluble in water to form thick, highly viscous solutions which usually can be gelled (crosslinked) by the addition of such inorganic salts as borax. Examples of some plants producing seeds containing galactomannan gums include Tara, Huizache, locust bean, Pola verde, Flame tree, guar bean plant, Honey locust, Lucerne, Kentucky coffee bean, Japanese pagoda tree, Indigo, Jenna, Rattlehox, Clover, Fenergruk seeds and soy bean hulls. The gum is provided in a convenient particulate form, wherein examples of polysaccharide include guar and its derivatives. These include guar gum, carboxymethylguar, hydroxyethylguar, carboxymethylhydroxyethylguar, hydroxypropylguar (HPG), carboxymethylhydroxypropylguar, and combinations thereof. As a galactomannan, guar gum is a branched copolymer containing a mannose backbone with galactose branches.

Upon hydrolysis, galactomannans may yield the two simple sugars, mannose, and galactose. Analyses have indicated that such polysaccharides are long chain polymers of D-mannopyranose units linked at the β-1,4 position which have D-galactopyranose units located as side chains on the molecule. The D-galactopyranose units are connected to the $C_6$ atoms of the D-mannose units that make up the main structural framework. The ratio of D-galactose to D-mannose in the galactomannans generally varies from about 1:1.2 to about 1:2, depending upon the particular vegetable source from which the material is derived. In all cases, however, the mannose residues have cis-hydroxyl groups at the $C_2$ and $C_3$ positions, accounting for the crosslinking reactions obtained with the galactomannans and making them useful for the purposes of the present application.

As discussed above, some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used, and have been shown to be useful as viscosifying agents as well. Biopolymers such as xanthan, diutan, whelan gum and scleroglucan may also be used. Synthetic polymers such as polyacrylamide and polyacrylate polymers and copolymers, as well as diutans, may be useful for high-temperature applications. Additional examples of suitable polymers are described in U.S. Pat. Nos. 5,981,446, 7,497,263 and 7,968,501, the disclosures of which are incorporated by reference herein in their entirety.

The polymer may be present in the wellbore fluid in an amount of from about 0.05 weight percent to about 10 weight percent, from about 0.1 weight percent to about 5 weight percent, from about 0.1 weight percent to about 2 weight percent and from about 0.1 weight percent to about 0.5 weight percent, based upon the total weight of the wellbore fluid.

Crosslinker

The wellbore fluid described herein may also include a crosslinker. As discussed above, fracturing fluid must be chemically stable and sufficiently viscous to suspend the proppant while it is sheared and heated in surface equipment, well tubulars, perforations and the fracture; otherwise, premature settling of the proppant occurs, jeopardizing the treatment. Crosslinkers join polymer chains for greater thickening.

The overall performance of a fracturing fluid intimately depends on the cross-linking chemistry that forms the viscous gel. Borate crosslinked gel fracturing fluid utilizes borate anion to crosslink the hydrated polysaccharide polymers and provide increased viscosity. The crosslink obtained by using borate is chemically reversible as triggered by altering the pH of the fluid system. The reversible characteristic of the crosslink in borate fluids helps subsequent clean up step more effectively, resulting in good retained permeability and conductivity.

It is desirable to use an insoluble form of boron with an identical electronic configuration of borax so that the well established boron crosslink chemistry can remain intact, together with the vast engineering procedures related to its application in stimulation industry.

When the crosslinker contain boron, the concentration of boron in the fluid may be in a range of from 0.5 ppm to 700 ppm elemental boron, from about 1.0 ppm to about 500 ppm, from about 5.0 ppm to about 250 ppm, from about 10 ppm to about 100 ppm, from about 15 ppm to about 75 ppm and from about 15 ppm to about 50 ppm. This also means that the proportion of boron to the polymer to be crosslinked may be low. Thus the amounts of the polymer and boron in the fluid may be such that the amount of boron is not more than 0.002 or 0.001 times the amount of the polymer. Expressing this in terms of concentrations, the content of boron may be not more than 2 ppm, possibly not more than 1 ppm for each gram of polymer in 1 liter of solution. For a solution containing 4 gm/liter of polymer to be crosslinked this would be no more than 8 ppm, possibly not more than 4 ppm boron in the solution. The quantity of cross linking agent may be no more than 30%, possibly no more than 20, 15 or 10% by weight of the polymer to be crosslinked.

In embodiments, the crosslinker includes at least silica and has a dimension of from about 5 nm to about 100 nm. In other embodiments, the crosslinker may have a dimension of from 10 nm to about 75 nm, from about 20 nm to about 60 nm, from about 25 nm to about 50 nm and from about 30 nm to about 40 nm. The cross-linking agents and any of the supporting structures within them may have at least one dimension which is at least 5 nanometer (5 nm). Whilst they may or may not have a spherical shape or a cylindrical shape, they may have a particle size, which is expressed as the diameter of an equivalent sphere, of at least 5 nm, possibly at least 10, 20 or 25 nm.

The crosslinker may also include a non-aqueous solvated crosslinker, such as borosilicate. Borosilicate is a material having a mole ratio of boron to silicon ranging from about 1:100 to about 2:5 and/or a mole ratio of sodium to silicon ranging from about 6:1000 to 1.04:1. The crosslinker may also be a colloid of borosilicate having a chemistry similar to that of borosilicate glass, such as, for example, an aqueous colloid. This colloid may be generally prepared by reacting an alkali metal salt of a boron containing compound with silicic acid under conditions resulting in the formation of a colloid. The surface area of the borosilicate should be in the range of from about 15 to about 3000 $m^2/g$, from about 50 to about 3000 $m^2/g$, from about 250 to 3000 $m^2/g$ and from about 700 to 3000 $m^2/g$.

As described in U.S. Pat. No. 6,310,104, the disclosure of which is incorporated by reference herein in its entirety, colloidal borosilicate materials may be prepared by first preparing silicic acid. This may be advantageously accomplished by contacting an alkali metal silicate solution, such as a dilute solution of the alkali metal silicate with a commercial cation exchange resin, such as a so called strong acid resin, in the hydrogen form and recovering a dilute solution of silicic acid. The silicic acid may then be added, with agitation to a dilute solution of an alkali metal borate at a pH of from 6-14, and a colloidal borosilicate product suspended in water is recovered. Alternatively, the alkali metal borate and the silicic acid may be added simultaneously to prepare suitable materials. The concentration of the silicic acid solution utilized is generally from 3 to 8 percent by weight $SiO_2$, and from about 5 to about 7 percent by weight $SiO_2$. The weight percent of the borate solution utilized is generally 0.01 to 30 and from 0.4 to 20 weight percent as $B_2O_3$. The borate salt utilized may range over a wide variety of compounds, wherein examples of the borate salt include commercial borax, sodium tetraborate decahydrate, or sodium tetraborate pentahydrate. Other water soluble borate materials may be utilized. The preparation of the colloidal borosilicate material of this application may be accomplished with or without pH adjustment as it is sometimes advisable to conduct the reaction at a pH of 7.5 to 10.5 or of 8 to 9.5 through the addition of an appropriate alkali metal hydroxide, such as sodium hydroxide, to the reaction mixture. Other methods of preparing the colloidal borosilicates of this application may also be utilized. These methods could encompass preparing the colloidal borosilicate as above and spray drying the particles followed by grinding, or other methods which would yield a borosilicate material meeting the parameters set forth above.

Embodiments of the borosilicate include, among others, silicon dioxide ($SiO_2$), boric oxide ($B_2O_3$), aluminum oxide ($Al_2O_3$), and at least one alkali oxide. The alkali oxide in the borosilicate may include lithium oxide ($Li_2O$), potassium oxide ($K_2O$), and sodium oxide ($Na_2O$). Not intending to be bound by theory, the $Al_2O_3$ may play a role in inhibiting the formation of cristobalite and tridymite crystals during the sintering of the borosilicate glass composition. In addition, the $B_2O_3$ may increase the meltability of the borosilicate and potentially act as an efficient flux without significantly increasing the coefficient of thermal expansion (CTE) of the borosilicate glass, while the alkali oxide may increase the CTE of the borosilicate glass. The borosilicate colloidal particles may have the ability to crosslink guar (and other polysaccharide polymers) effectively since its great population of surface accessible boron atoms retains essentially identical electronic configuration to tetrahedral borate anion which, in an appropriate pH domain, enables the formation of complex associations with the abundant cis-hydroxyl groups in sugar residues.

The crosslinker may further include one or more transition metals, such as zirconium, titanium and aluminum. One or more of the above crosslinkers may be included in the wellbore composition such that a "combination" of these materials is included in the wellbore composition. In some embodiments, the silica has a concentration of 20-50 wt % in the crosslinker.

Furthermore, in certain instances, a delay in crosslinking may be advantageous. For example, a delayed crosslinker can be placed downhole prior to crosslinking; the gel fluid is prepared on the surface, then crosslinks after being introduced into a wellbore which penetrates a subterranean formation, forming a high viscosity treating fluid therein. The delay in crosslinking is beneficial in that the amount of energy required to pump the fluids can be reduced, the penetration of certain fluids can be improved, and shear and friction damage to polymers can be reduced. By delaying crosslinking, crosslinkers can be more thoroughly mixed with the polymer fluid prior to crosslink initiation, providing more effective crosslinks, more uniform distribution of crosslinks, and better gel properties.

Additional Materials

The wellbore fluid of the present application may also include additional constituents or material. One additional material that may be included is a breaker. The purpose of this material is to "break" or diminish the viscosity of the crosslinked fluid so that this fluid is more easily recovered from the formation during cleanup. The breaker degrades the crosslinked polymer to reduce its molecular weight. If the polymer is a polysaccharide, the breaker may be a peroxide with oxygen-oxygen single bonds in the molecular structure. These peroxide breakers may be hydrogen peroxide or other material such as a metal peroxide that provides peroxide or hydrogen peroxide for reaction in solution. A peroxide breaker may be a so-called stabilized peroxide breaker in which hydrogen peroxide is bound or inhibited by another compound or molecule(s) prior to its addition to water but is released into solution when added to water.

Examples of suitable stabilized peroxide breakers include the adducts of hydrogen peroxide with other molecules, and may include carbamide peroxide or urea peroxide ($CH_4N_2O.H_2O_2$), percarbonates, such as sodium percarbonate ($2Na_2CO_3.3H_2O_2$), potassium percarbonate and ammonium percarbonate. The stabilized peroxide breakers may also include those compounds that undergo hydrolysis in water to release hydrogen peroxide, such sodium perborate. A stabilized peroxide breaker may be an encapsulated peroxide. The encapsulation material may be a polymer that can degrade over a period of time to release the breaker and may be chosen depending on the release rate desired. Degradation of the polymer can occur, for example, by hydrolysis, solvolysis, melting, or other mechanisms. The polymers may be selected from homopolymers and copolymers of glycolate and lactate, polycarbonates, polyanhydrides, polyorthoesters, and polyphosphacenes. The encapsulated peroxides may be encapsulated hydrogen peroxide, encapsulated metal peroxides, such as sodium peroxide, calcium peroxide, zinc peroxide, etc. or any of the peroxides described herein that are encapsulated in an appropriate material to inhibit or reduce reaction of the peroxide prior to its addition to water.

The peroxide breaker, stabilized or unstabilized, is used in an amount sufficient to break the heteropolysaccharide polymer or diutan. This may depend upon the amount of heteropolysaccharide used and the conditions of the treatment. Lower temperatures may require greater amounts of the breaker. In many, if not most applications, the peroxide breaker may be used in an amount of from about 0.001% to about 20% by weight of the treatment fluid, more particularly from about 0.005% to about 5% by weight of the treatment fluid, and more particularly from about 0.01% to about 2% by weight of the treatment fluid. The peroxide breaker may be effective in the presence of mineral oil or other hydrocarbon carrier fluids or other commonly used chemicals when such fluids are used with the heteropolysaccharide.

The breaker may also be encapsulated or in an enclosure to the delay the release of the breaker, such as those disclosed in U.S. Pat. No. 4,741,401 (Walles, et. al), hereinafter incorporated by reference in its entirety. Additional examples of breakers include: ammonium, sodium or potassium persulfate; sodium peroxide; sodium chlorite; sodium, lithium or calcium hypochlorite; bromates; perborates; permanganates; chlorinated lime; potassium perphosphate; magnesium monoperoxyphthalate hexahydrate; and a number of organic chlorine derivatives such as N,N'-dichlorodimethylhydantoin and N-chlorocyanuric acid and/or salts thereof. The specific breaker employed may depend on the temperature to which polymer gel is subjected. At temperatures ranging from about 50° C. to about 95° C., an inorganic breaker or oxidizing agent, such as, for example, $KBrO_3$, and other similar materials, such as $KClO_3$, $KIO_3$, perborates, persulfates, permanganates (for example, ammonium persulfate, sodium persulfate, and potassium persulfate) and the like, are used to control degradation of the polymer gel. At about 90 to 95° C. and above, typical breakers include suitable breaker, an example of which is sodium bromate.

Breaking aids or catalysts may be used with the peroxide breaker. The breaker aid may be an iron-containing breaking aid that acts as a catalyst. The iron catalyst is a ferrous iron (II) compound. Examples of suitable iron (II) compounds include, but are not limited to, iron (II) sulfate and its hydrates (such as, for example, ferrous sulfate heptahydrate), iron (II) chloride, and iron (II) gluconate. Iron powder in combination with a pH adjusting agent that provides an acidic pH may also be used. Other transition metal ions can also be used as the breaking aid or catalyst, such as manganese (Mn).

Some fluids according to the present application may also include a surfactant. Any surfactant for which its ability to aid the dispersion and/or stabilization of the gas component into the base fluid to form an energized fluid is readily apparent to those skilled in the art may be used. Viscoelastic surfactants, such as those described in U.S. Pat. No. 6,703,352 (Dahayanake et al.) and U.S. Pat. No. 6,482,866 (Dahayanake et al.), both incorporated herein by reference in their entirety, are also suitable for use in wellbore fluids.

In some embodiments, the surfactant may be an ionic surfactant. Examples of suitable ionic surfactants include anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates. Examples of suitable ionic surfactants also include cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include surfactants that are usually regarded as zwitterionic surfactants, and in some cases as amphoteric surfactants, such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments, the surfactant is a cationic, zwitterionic or amphoteric surfactant containing and amine group or a quaternary ammonium group in its chemical structure ("amine functional surfactant"). A particularly useful surfactant is the amphoteric alkyl amine contained in the surfactant solution AQUAT 944 (available from Baker Petrolite of 12645 W. Airport Blvd, Sugar Land, Tex. 77478 USA). In other embodiments, the surfactant may be a blend of two or more of the surfactants described above, or a blend of any of the surfactant or surfactants described above with one or more nonionic surfactants. Examples of suitable nonionic surfactants include alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in the wellbore fluid. These fluids may incorporate the surfactant or blend of surfactants in an amount of about 0.02 wt % to about 5 wt % of total liquid phase weight, or from about 0.05 wt % to about 2 wt % of total liquid phase weight.

Other materials which may be included in a wellbore fluid include electrolyte, such as an organic or inorganic salt, friction reducers to assist flow when pumping and surfactants.

A wellbore fluid may be a so-called energized fluid formed by injecting gas (most commonly nitrogen, carbon dioxide or mixture of them) into the wellbore concomitantly with the aqueous solution. Dispersion of the gas into the base fluid in the form of bubbles increases the viscosity of such fluid and impacts positively its performance, particularly its ability to effectively induce hydraulic fracturing of the formation, and capacity to carry solids. The presence of the gas also enhances the flowback of the fluid when this is required. In a method of this application the wellbore fluid may serve as a fracturing fluid or gravel packing fluid and may be used to suspend a particulate material for transport down wellbore. This material may in particular be a proppant used in hydraulic fracturing or gravel used to form a gravel pack. The most common material used as proppant or gravel is sand of selected size but ceramic particles and a number of other materials are known for this purpose.

Wellbore fluids in accordance with this application may also be used without suspended proppant in the initial stage of hydraulic fracturing. Further applications of wellbore fluids in accordance with this application are in modifying the permeability of subterranean formations, and the placing of plugs to achieve zonal isolation and/or prevent fluid loss.

For some applications a fiber component may be included in the treatment fluid to achieve a variety of properties including improving particle suspension, and particle transport capabilities, and gas phase stability. Fibers used may be hydrophilic or hydrophobic in nature. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like. When used in fluids of the application, the fiber component may be present at concentrations from about 1 to about 15 grams per liter of the liquid phase, in particular the concentration of fibers may be from about 2 to about 12 grams per liter of liquid, and more particularly from about 2 to about 10 grams per liter of liquid.

Friction reducers may also be incorporated into fluids of the application. Any friction reducer may be used. Also, polymers such as polyacrylamide, polyisobutyl methacrylate, polymethyl methacrylate and polyisobutylene as well as water-soluble friction reducers such as guar gum, guar gum derivatives, polyacrylamide, and polyethylene oxide may be used. Commercial drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" have also been found to be effective. These polymeric species added as friction reducers or viscosity index improvers may also act as excellent fluid loss additives reducing or even eliminating the need for conventional fluid loss additives.

Embodiments of the present application may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry and apricot; ground or crushed seed shells of other plants such as various forms of corn (corn cobs or corn kernels); processed wood materials such as those derived from woods such as oak, hickory, walnut, poplar and mahogany, including such woods that have been processed by grinding, chipping, or other form of particalization, processing. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference in its entirety.

The concentration of proppant in the fluid can be any concentration known in the art, and may be in the range of from about 0.03 to about 3 kilograms of proppant added per liter of liquid phase. Also, any of the proppant particles can be further coated with a resin to potentially improve the strength, clustering ability, and flow back properties of the proppant.

The aqueous medium of the present application may be water or brine. In those embodiments, the aqueous medium is a brine, the brine is water comprising an inorganic salt or organic salt. Examples of inorganic salts include alkali metal halides, such as potassium chloride. The carrier brine phase may also comprise an organic salt such as sodium or potassium formate. Preferred inorganic divalent salts include calcium halides, such as, for example, calcium chloride or calcium bromide. Sodium bromide, potassium bromide, or cesium bromide may also be used. The salt is chosen for compatibility reasons, this determination may be based upon the reservoir drilling fluid used a particular brine phase and the completion/clean up fluid brine phase is chosen to have the same brine phase.

Fluid embodiments of the present application may further contain other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, alcohols, scale inhibitors, corrosion inhibitors, fluid-loss additives, bactericides, and the like. Also, they may include a co-surfactant to optimize viscosity or to minimize the formation of stable emulsions that contain components of crude oil or the hydratable polymer.

Aqueous fluid embodiments of the present application may also comprise an organoamino compound. Examples of suitable organoamino compounds include tetraethylenepentamine, triethylenetetramine, pentaethylenhexamine, triethanolamine, and the like, or any mixtures thereof. When organoamino compounds are used, they may be incorporated at an amount from about 0.01 wt % to about 2.0 wt % based on total liquid phase weight. Preferably, when used, the organoamino compound is incorporated at an amount from about 0.05 wt % to about 1.0 wt % based on total liquid phase weight. A particularly useful organoamino compound is tetraethylenepentamine.

The well treatment composition may then be introduced or placed in the wellbore or subterranean formation. As used herein, the term "introducing" or "introduced" refers to mechanism of locating the well treatment composition in the wellbore or subterranean formation by various methods and/or with suitable equipment typically used in various oilfield operations, such as fracturing and cementing. Examples of "introducing" mechanisms include such as, for example, pumping the well treatment composition through the wellbore or through installed coiltubing.

The following examples are presented to illustrate the preparation and properties of aqueous viscoelastic nanotube fluids and should not be construed to limit the scope of the application, unless otherwise expressly indicated in the appended claims. All percentages, concentrations, ratios, parts, etc. are by weight unless otherwise noted or apparent from the context of their use. The statements made herein merely provide information related to the present disclosure and may not constitute prior art, and may describe some embodiments illustrating the application.

EXAMPLES

Example 1

The sample was prepared by adding 3 mL borosilicate colloidal dispersion into 200 mL fully hydrated (Di-water) guar linear gel, under constant mixing in a conventional glass blender cup. The vortex was closed within about a minute, which signaled the transformation from a linear polymer gel to a crosslinked polymer gel. The pH of the crosslinked polymer gel was then determined to be 9.1. Then, about a 30 ml volume sample was transferred to a Couette cup, and assembled onto a M5500 rheometer (GRACE Instrument Company, Houston, Tex.). The sample was covered under a 200 psia nitrogen blanket in the headspace to prevent water from evaporation at elevated temperatures. The polymer gel went through a process of thermal thinning, characteristic to typical crosslinked fluid, as the rheometer heated up. Subsequently, the polymer gel regained the viscosity when the fluid temperature stabilized. The viscosity was measured at a constant shear rate of 100/s. As shown in FIG. 1, at a normal concentration level of 5 ppm boron as determined via inductively coupled plasma, the borosilicate colloidal dispersion crosslinks 30 lbm/1,000 gal US guar. In comparison to conventional aqueous borate counterpart, it takes less boron to achieve the same level of overall viscosity, indicating a more effective crosslinking. Also, it does not require as high pH for crosslinking.

Example 2

The sample was prepared by adding 3.8 mL borosilicate colloidal dispersion into 100 mL fully hydrated (Di-water) guar linear gel, under constant mixing in a conventional glass blender cup. The vortex was closed within about a minute, which signaled the transformation from a linear polymer gel to a crosslinked polymer gel. The pH of the crosslinked polymer gel was then determined to be 9.7. Then, about a 30 ml volume sample was transferred to a Couette cup, and assembled onto a M7500 Ultra HTHP rheometer (GRACE Instrument Company, Houston, Tex.). The viscosity was measured at a constant shear rate of 100/s. A viscosity loss is observed when the static pressure ramps up from ambient to 20,000 psia, but is subsequently regained as a result of the pressure removal. Again, this is a typical pressure effect for boron crosslinked polymers. But for the borosilicate colloidal crosslinker, the extent of such an adverse effect is significantly reduced compared to the aqueous borate counterpart. FIG. 2 shows the rheological profile of 12.4 ppm boron in borosilicate colloidal dispersions crosslinking 30 lbm/1,000 galUS guar at 120° F.

The foregoing disclosure and description is illustrative and explanatory thereof and it can be readily appreciated by those skilled in the art that various changes in the size, shape and materials, as well as in the details of the illustrated construction or combinations of the elements described herein can be made without departing from the spirit of the disclosure.

While the embodiments have been illustrated and described in detail in the drawings and foregoing description, the same is to be considered as illustrative and not restrictive in character, it being understood that only some embodiments have been shown and described and that all changes and modifications that come within the spirit of the applications are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Although only a few example embodiments have been described in detail above, those skilled in the art will readily appreciate that many modifications are possible in the example embodiments without materially departing from this application. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method of treatment of a wellbore or a subterranean formation penetrated by a wellbore, the method comprising:
   introducing a wellbore composition to the wellbore or the subterranean formation, the wellbore composition comprised of at least a hydratable polymer and a crosslinker, wherein the crosslinker is comprised of at least borosilicate, the crosslinker having a dimension of from about 5 nm to about 100 nm.

2. The method of claim 1, wherein the hydratable polymer is a polysaccharide.

3. The method of claim 1, wherein the hydratable polymer is present in an amount of from about 0.05 weight percent to about 10 weight percent.

4. The method of claim 1, wherein the hydratable polymer is selected from the group consisting of guar, hydropropyl guar (HPG), carboxymethyl guar (CMG), carboxymethylhydroxypropyl guar, cellulose, hydroxyethylcellulose (HEC), hydroxypropylcellulose (HPC), carboxymethylhydroxyethylcellulose (CMHEC), xanthan, diutan, whelan gum, polyacrylamide, polyacrylate polymers.

5. The method of claim 1, wherein the crosslinker comprises particles with a dimension of from about 10 nm to about 20 nm.

6. The method of claim 1, wherein the content of boron in the wellbore fluid is between 0.5 and 10 ppm by weight elemental boron.

7. The method of claim 1, wherein the wellbore fluid contains not more than 5 ppm boron for each gram of the hydratable polymer per liter of the wellbore fluid.

8. The method of claim 1, wherein the silica has a concentration of 20-50 wt % in the crosslinker.

9. The method of claim 1, wherein the crosslinker further comprises zirconium, titanium, or a combination thereof.

* * * * *